(12) United States Patent
Guirguis et al.

(10) Patent No.: US 11,475,006 B2
(45) Date of Patent: Oct. 18, 2022

(54) QUERY AND CHANGE PROPAGATION SCHEDULING FOR HETEROGENEOUS DATABASE SYSTEMS

(71) Applicant: Oracle International Corporation, Redwood Shores, CA (US)

(72) Inventors: Shenoda Guirguis, San Jose, CA (US); Sabina Petride, Tracy, CA (US)

(73) Assignee: Oracle International Corporation, Redwood Shores, CA (US)

( * ) Notice: Subject to any disclaimer, the term of this patent is extended or adjusted under 35 U.S.C. 154(b) by 476 days.

(21) Appl. No.: 15/368,345

(22) Filed: Dec. 2, 2016

(65) Prior Publication Data

US 2018/0157710 A1 Jun. 7, 2018

(51) Int. Cl.
*G06F 16/2453* (2019.01)
*G06F 16/27* (2019.01)

(52) U.S. Cl.
CPC ........ *G06F 16/24545* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 4,507,751 A | 3/1985 | Gawlick et al. | |
| 4,710,926 A | 12/1987 | Brown et al. | |
| 4,782,325 A | 11/1988 | Jeppsson et al. | |
| 4,945,474 A | 7/1990 | Elliott et al. | |
| 5,095,421 A | 3/1992 | Freund | |
| 5,146,571 A | 9/1992 | Logan | |
| 5,182,752 A | 1/1993 | DeRoo et al. | |
| 5,233,618 A | 8/1993 | Gilder et al. | |
| 5,241,675 A | 8/1993 | Sheth et al. | |
| 5,263,156 A | 11/1993 | Bowen et al. | |
| 5,287,496 A | 2/1994 | Chen et al. | |
| 5,327,556 A | 7/1994 | Mohan | |
| 5,329,628 A | 7/1994 | Yomamoto et al. | |

(Continued)

FOREIGN PATENT DOCUMENTS

| | | |
|---|---|---|
| EP | 0 503 417 A2 | 9/1992 |
| EP | 050180 A | 9/1992 |

(Continued)

OTHER PUBLICATIONS

Ramez Elmasri; Fundamentals of Databse Systems; 2000; Addison-Wesly; pp. 580-628 and 771-786 (Year: 2000).*

(Continued)

*Primary Examiner* — Amresh Singh
*Assistant Examiner* — Jermaine A Mincey
(74) *Attorney, Agent, or Firm* — Hickman Becker Bingham Ledesma LLP

(57) ABSTRACT

Techniques are presented herein for efficient query processing and data change propagation at a secondary database system. The techniques involve determining execution costs for executing a query at a primary DBMS and for executing the query at an offload DBMS. The cost for executing the query at the offload DBMS includes the cost of propagating changes to database objects required by the query to the offload DBMS. Based on the execution cost, the query is sent to either the primary DBMS or the offload DBMS.

22 Claims, 6 Drawing Sheets

(56) References Cited

U.S. PATENT DOCUMENTS

| | | |
|---|---|---|
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,423,037 A | 6/1995 | Hvasshovd |
| 5,454,102 A | 9/1995 | Tang et al. |
| 5,487,164 A | 1/1996 | Kirchhofer et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,806,076 A | 9/1998 | Ngai et al. |
| 5,870,758 A | 2/1999 | Bamford et al. |
| 5,870,759 A | 2/1999 | Bauer et al. |
| 5,870,763 A | 2/1999 | Lomet |
| 5,893,930 A | 4/1999 | Song |
| 5,924,096 A | 7/1999 | Draper et al. |
| 5,956,731 A | 9/1999 | Bamford et al. |
| 5,960,436 A | 9/1999 | Chang et al. |
| 5,974,427 A | 10/1999 | Reiter |
| 5,983,277 A | 11/1999 | Heile et al. |
| 5,991,771 A | 11/1999 | Falls et al. |
| 6,009,432 A | 12/1999 | Tarin |
| 6,009,542 A | 12/1999 | Koller et al. |
| 6,014,669 A | 1/2000 | Slaughter et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1 | 2/2003 | Sunkara |
| 6,529,906 B1 | 3/2003 | Chan |
| 6,535,869 B1 | 3/2003 | Housel, III |
| 6,560,743 B2 | 5/2003 | Plants |
| 6,574,717 B1 | 6/2003 | Ngai et al. |
| 6,691,139 B2 | 2/2004 | Ganesh et al. |
| 6,728,879 B1 | 4/2004 | Atkinson |
| 6,732,125 B1 | 5/2004 | Autrey et al. |
| 6,751,616 B1 | 6/2004 | Chan |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 7,003,694 B1 | 2/2006 | Anderson et al. |
| 7,024,656 B1 | 4/2006 | Ahad |
| 7,076,508 B2 | 7/2006 | Bourbonnais et al. |
| 7,080,075 B1 | 7/2006 | Chan |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,155,463 B1 | 12/2006 | Wang et al. |
| 7,222,136 B1 | 5/2007 | Brown et al. |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,284,151 B2 | 10/2007 | Chandrasekaran |
| 7,287,034 B2 | 10/2007 | Wong et al. |
| 7,290,017 B1 | 10/2007 | Wang et al. |
| 7,293,011 B1 | 11/2007 | Bedi |
| 7,363,538 B1 | 4/2008 | Joydip et al. |
| 7,370,068 B1 | 5/2008 | Pham et al. |
| 7,464,113 B1 | 12/2008 | Girkar et al. |
| 7,599,967 B2 | 10/2009 | Girkar et al. |
| 7,600,063 B2 | 10/2009 | Loaiza |
| 7,627,612 B2 | 12/2009 | Ahal et al. |
| 7,627,614 B2 | 12/2009 | Hu et al. |
| 7,644,084 B2 | 1/2010 | Rapp |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2 | 9/2011 | Seddukhin |
| 8,286,182 B2 | 10/2012 | Chan |
| 8,364,648 B1 | 1/2013 | Sim-Tang |
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2 | 4/2014 | Krishnan et al. |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1 | 7/2015 | Chu |
| 9,146,934 B2 | 9/2015 | Hu et al. |
| 9,244,996 B2 | 1/2016 | Bourbonnais |
| 9,767,178 B2 | 9/2017 | Srivastava et al. |
| 2002/0049950 A1 | 4/2002 | Loaiza et al. |
| 2002/0091718 A1 | 7/2002 | Bohannon et al. |
| 2002/0112022 A1 | 8/2002 | Kazar et al. |
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061227 A1 | 3/2003 | Baskins |
| 2003/0061537 A1 | 3/2003 | Cha et al. |
| 2003/0126114 A1 | 7/2003 | Tedesco |
| 2003/0140050 A1 | 7/2003 | Li |
| 2003/0140288 A1 | 7/2003 | Loaiza et al. |
| 2003/0212660 A1 | 11/2003 | Kerwin |
| 2003/0217064 A1 | 11/2003 | Walters |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0243578 A1 | 12/2004 | Chan |
| 2004/0267809 A1 | 12/2004 | East et al. |
| 2005/0005083 A1 | 1/2005 | Ozdemir |
| 2005/0022047 A1 | 1/2005 | Chandrasekaran |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1 | 1/2006 | Pommerenk |
| 2006/0047713 A1 | 3/2006 | Gornshtein |
| 2006/0064405 A1 | 3/2006 | Jiang et al. |
| 2006/0080646 A1 | 4/2006 | Aman |
| 2006/0112222 A1 | 5/2006 | Barall |

(56) References Cited

U.S. PATENT DOCUMENTS

| | | |
|---|---|---|
| 2006/0129595 A1 | 6/2006 | Sankaran |
| 2006/0168585 A1 | 7/2006 | Grcevski |
| 2006/0173833 A1 | 8/2006 | Purcell et al. |
| 2006/0200497 A1 | 9/2006 | Hu et al. |
| 2006/0212481 A1 | 9/2006 | Stacey et al. |
| 2006/0212573 A1 | 9/2006 | Loaiza |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | MacHardy et al. |
| 2007/0174292 A1* | 7/2007 | Li ................ G06F 16/24539 |
| 2007/0226277 A1 | 9/2007 | Holenstein et al. |
| 2007/0239680 A1 | 10/2007 | Oztekin et al. |
| 2008/0005112 A1 | 1/2008 | Shavit |
| 2008/0016074 A1 | 1/2008 | Ben-dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0162587 A1 | 7/2008 | Auer |
| 2008/0177803 A1 | 7/2008 | Fineberg et al. |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0182746 A1 | 7/2009 | Mittal et al. |
| 2009/0248756 A1 | 10/2009 | Akidau |
| 2009/0268903 A1 | 10/2009 | Bojinov et al. |
| 2009/0307290 A1 | 12/2009 | Barsness et al. |
| 2010/0036843 A1 | 2/2010 | MacNaughton et al. |
| 2010/0082646 A1* | 4/2010 | Meek ................ G06F 16/252 707/752 |
| 2010/0082648 A1 | 4/2010 | Potapov |
| 2010/0122026 A1 | 5/2010 | Umaamageswaran et al. |
| 2010/0145909 A1 | 6/2010 | Ngo |
| 2010/0211577 A1 | 8/2010 | Shimuzu et al. |
| 2010/0235335 A1 | 9/2010 | Heman et al. |
| 2010/0250549 A1 | 9/2010 | Muller et al. |
| 2010/0318495 A1* | 12/2010 | Yan ................ G06F 16/2453 707/618 |
| 2010/0318570 A1 | 12/2010 | Narasinghanallur et al. |
| 2011/0004586 A1 | 1/2011 | Cherryholmes et al. |
| 2011/0029569 A1 | 2/2011 | Ganesh et al. |
| 2011/0060724 A1 | 3/2011 | Chan |
| 2011/0066791 A1 | 3/2011 | Goyal et al. |
| 2011/0087633 A1 | 4/2011 | Kreuder et al. |
| 2011/0087637 A1 | 4/2011 | Sundaram et al. |
| 2011/0099179 A1 | 4/2011 | Balebail |
| 2011/0138123 A1 | 6/2011 | Aditya et al. |
| 2011/0145207 A1 | 6/2011 | Agrawal et al. |
| 2011/0231362 A1 | 9/2011 | Attarde et al. |
| 2011/0238655 A1 | 9/2011 | Clorain et al. |
| 2011/0307450 A1 | 12/2011 | Hahn et al. |
| 2012/0054158 A1 | 3/2012 | Hu et al. |
| 2012/0054533 A1 | 3/2012 | Shi et al. |
| 2012/0109926 A1 | 5/2012 | Novik et al. |
| 2012/0173515 A1 | 7/2012 | Jeong et al. |
| 2012/0278282 A1 | 11/2012 | Lu |
| 2012/0284228 A1 | 11/2012 | Ghosh |
| 2012/0323849 A1 | 12/2012 | Garin et al. |
| 2012/0323971 A1 | 12/2012 | Pasupuleti |
| 2013/0085742 A1 | 4/2013 | Baker et al. |
| 2013/0117237 A1 | 5/2013 | Thomsen et al. |
| 2013/0132674 A1 | 5/2013 | Sundrani |
| 2013/0185270 A1 | 7/2013 | Brower |
| 2013/0198133 A1 | 8/2013 | Lee |
| 2013/0212068 A1 | 8/2013 | Talius et al. |
| 2014/0040218 A1 | 2/2014 | Kimura et al. |
| 2014/0059020 A1 | 2/2014 | Hu et al. |
| 2014/0075493 A1 | 3/2014 | Krishnan et al. |
| 2014/0095452 A1 | 4/2014 | Lee et al. |
| 2014/0095530 A1 | 4/2014 | Lee et al. |
| 2014/0095546 A1 | 4/2014 | Kruglikov et al. |
| 2014/0164331 A1 | 6/2014 | Li et al. |
| 2014/0258241 A1 | 9/2014 | Chen |
| 2014/0279840 A1 | 9/2014 | Chan et al. |
| 2015/0032694 A1 | 1/2015 | Rajamani et al. |
| 2015/0088811 A1 | 3/2015 | Hase et al. |
| 2015/0088822 A1 | 3/2015 | Raja et al. |
| 2015/0088824 A1 | 3/2015 | Kamp et al. |
| 2015/0088830 A1 | 3/2015 | Kamp |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0120659 A1 | 4/2015 | Srivastava et al. |
| 2015/0120780 A1 | 4/2015 | Jain |
| 2015/0254240 A1 | 9/2015 | Li et al. |
| 2015/0317183 A1 | 11/2015 | Little |
| 2016/0179867 A1 | 6/2016 | Li et al. |
| 2016/0292167 A1* | 10/2016 | Tran ................ G06F 16/24542 |
| 2017/0116252 A1 | 4/2017 | Krishnaswamy |
| 2017/0116298 A1 | 4/2017 | Ravipati |
| 2018/0046550 A1* | 2/2018 | Chang ................ G06F 16/24535 |
| 2018/0046691 A1* | 2/2018 | Barsness ................ G06F 11/1402 |
| 2018/0121511 A1 | 5/2018 | Li |
| 2018/0165324 A1 | 6/2018 | Krishnaswamy |

FOREIGN PATENT DOCUMENTS

| | | |
|---|---|---|
| EP | 2 608 070 A1 | 6/2013 |
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |
| WO | WO 2007/078444 A1 | 7/2007 |

OTHER PUBLICATIONS

Ramex Elmasri; The Fundamentals of Database Systems; Peason; 2003; Fourth Edition; pp. 1-1029 (Year: 2003).*

WenlieXie; Asynchronous Large-Scale Graph Processing Made Easy; Academia; 2013; pp. 1-13 (Year: 2013).*

S. Guirguis, M. A. Sharaf, P. K. Chrysanthis, A. Labrinidis, and K. Pruhs, "Adaptive scheduling of web transactions", In ICDE, dated 2009, 13 pages.

Oracle, "Oracle Database In-Memory", Oracle White Paper, Oracle 2014, updated Feb. 2019, 44 pages.

G. Buttazzo, M. Spuri, and F. Sensini. "Value vs. deadline scheduling in overload conditions", In Proc. of RTSS '95, dated 1995, 10 pages.

B. Schroeder and M. Harchol-Balter. "Web servers under overload: How scheduling can help", ACM Trans. Inter. Tech., 6(1):20-52, dated 2006, 20 pages.

W. Cao and D. Aksoy. "Beat the clock: a multiple attribute approach for scheduling data broadcast". In MobiDE '05, pp. 89-96, 2005, 8 pages.

D.-Z. He, F.-Y. Wang, W. Li, and X.-W. Zhang. "Hybrid earliest deadline first preemption threshold scheduling for real-time systems". In ICMLC, dated 2004, 6 pages.

Teschke, et al., "Concurrent Warehouse Maintenance Without Comprising Session Consistency", 1998, 10 pages.

Vassilakis et al., "Implementation of Transaction and Concurrency Control Support in a Temporal DBMS" Information Systems, vol. 23, No. 5, 1998, 16 pages.

Bober et al., "On Mixing Queries and Transactions Via Multiversion Locking", IEEE, 1992, 11 pages.

Mohan et al., "Efficient and Flexible Methods for Transient Versioning of Records to Avoid Locking by Reading-Only Transactions", XP 000393583, IBM Almaden Research Center, Dated Feb. 6, 1992, 11 pages.

(56) References Cited

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Help Center, "Database 2 Day + Data Replication and Integration Guide", 3 Accessing and Modifying Information in Multiple Databases, dated 2016, 14 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Zhe, Li, et al., "PERF join: an alternative to two-way semijoin and Bloomjoin" Proceedings of the 1995 ACM, New York. NY, US., 1995, pp. 187-144.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Loizos, M., et al., "Improving distributed join efficiency with extended bloom filter operations", Advanced Networking and Applications, 2007. AINA '07., 21st international Conf. IEEE, May 1, 2007.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

IBM, "A Scheduling Algorithm for Processing Mutually Exclusive Workloads in a Multi-System Configuration", dated Aug. 19, 2002, IEEE, 3 pages.
Zhang Ho et al., "In-Memory Big Data Management and Processing: A Survery", IEEE Transactions on Knowledge and Data Engineering, vol. 27, No. 7, dated Jul. 31, 2015, 30 pages.
Vishal Sikka et al., "Efficient Transaction Processing in SAP Hana Database", Proceedings of the 2012, International Conference on Management of Data, dated Jan. 31, 2012, 12 pages.
Farber et al., "SAP HANA Database—Data Management for Modern Business Applications", SIGMOD Record, dated Dec. 2011, vol. 40, No. 4, 8 pages.
Khalid Sayood:, "Introduction to data Compression", Morgan Kaufmann Publisher, dated Dec. 1996, 4 pages.
Nadimpalli, Rajeev, "How to Run Two or More Databases in Different Time Zones on the Same Machine", dated May 2002, 7 pages.
Antoni Cau, et al., "Specifying Fault Tolerance within Stark's Formalism," 1993, IEEE, pp. 392-401.
IBM Corp., "IBM OS/2 Extended Edition Configuration," Feb. 1990, IBM Technical Disclosure Bulletin, vol. 32, No. 9B, pp. 446-451.
Alapati, S., Backing Up Databases. In: Expert Oracle Database 11g Administration, Apress, dated 2009, pp. 1-70.
Oracle, "Oracle Data Guard", Concepts and Administration 12c Release 1 (12.1), dated Nov. 2015, 50 pages.
Oracle, "Oracle Active Data Guard", Real-Time Protection and Availability, Oracle White Paper, dated Oct. 2015, 22 pages.
Oracle, "Maximum Availability Architecture", Oracle Best Practices for High Availability, dated Sep. 2011, 42 pages.
Werner Vogels, "Eventually Consistent", CACM, dated Dec. 19, 2007, 4 pages.
V Sikka et al., Efficient Transaction Processing in SAP HANA Database: the End of a Column Store Myth, SIGMOD dated 2012, 11 pages.
Oracle® Flashback Technologies, http://www.oracle.com/technetwork/database/features/availability/flashbackoverview-082751.html, last viewed on Dec. 5, 2019, 3 pages.
Oracle® TimesTen In-Memory Database and TimesTen Application-Tier Database Cache, www.oracle.com/technetwork/database/databasetechnologies/timesten/overview/index.html, viewed on Dec. 5, 2019, 1pg.
Oracle Help Center, Oracle® TimesTen Application-Tier Database Cache User's Guide: Read-only Cache Groups, http://stdoc.us.oracle.com/12/12102/TTCAC/define.htm#TTCAC211, viewed on Dec. 5, 2019, 10 pages.
Ma et al., On benchmarking online social media analytical queries. In First International Workshop on Graph Data Management Experiences and Systems (GRADES '13). ACM, Article, dated 2013, 7 pages.
Labrinidis et al., "Balancing Performance and Data Freshness in Web Database Servers", VLDB dated 2003, 12 pages.
Jeff Erickson, In-Memory Acceleration for the Real-Time Enterprise,http://www.oracle.com/us/corporate/features/database-in-memoryoption/index.html, last viewed on Dec. 5, 2019, 4 pages.
Gary Marchionini, Exploratory Search: From Finding to Understanding. Communications. ACM 49, 4, dated Apr. 2006, pp. 41-46.

* cited by examiner

QUERY AND CHANGE PROPAGATION SCHEDULING FOR HETEROGENEOUS DATABASE SYSTEMS

FIELD OF THE INVENTION

The present invention relates to database management systems and in particular, to query and change propagation scheduling for a heterogeneous database system.

BACKGROUND

Big data analytics is a process for examining large data sets to determine patterns, correlations, trends, and other information. An emerging trend in big data analytic applications is to use a secondary database system to offload large analytic queries from a primary database system, in order to boost query processing performance. The secondary database system may act as a query processing system that does not support all features of a standard database system. For example, the secondary database system may not be able to directly receive database statements or data changes from a client application. Rather, the secondary database system may rely on the primary database system to be ACID (Atomicity, Consistency, Isolation, Durability) compliant, as expected in standard database systems.

The secondary database system may store a copy of data on which queries received at the primary database system execute. Data changes are received and executed on the primary database system. New or updated data must be added to the database of the secondary database system, and deleted data must be removed.

A possible method for propagating changes to the secondary database is propagating changes on an as-needed, on-demand basis, when data is targeted by a query. Although on-demand propagation may spread out the computing cost of propagating changes, it increases the response time required when executing a query.

Another possible method is to propagate changes as soon as they are received or committed in the primary database system. This results in a faster query response time compared to on-demand propagation, but results in high overhead for the database system when large amounts of changes are received within a short amount of time by the primary database system.

A third possible method is to schedule change propagation at specific times or at regular intervals. However, this method does not guarantee that secondary database system will have up-to-date data prior to executing a query in the secondary database system. Thus, this method does not guarantee that a query will produce accurate results.

However, for data analytics queries, such as those performed for big data analytics, data consistency is required in order for a query to produce accurate results. Furthermore, since the goal of using of a secondary system is to increase query execution efficiency, query performance cannot be significantly affected by change propagation. Thus, a method for change propagation that maintains both data consistency and query execution efficiency is required.

Additionally, most systems that use a particular propagation method require users to configure the primary and secondary database system and select a particular change propagation method based on what the user expects the database systems' workload and data change pattern to be. Once the secondary database system is configured, it may be difficult or impossible to switch between different propagation methods if the workload and/or data change pattern is not as expected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for efficient query processing and data change propagation at a secondary database system. As described above, a secondary database system may be configured to execute queries, or portions thereof, received at a primary database system. Database changes made at the primary database system are copied to the secondary database system.

The primary database system includes a scheduler process that determines when, and if, queries and database changes should be sent to the secondary database system. One or more tasks are created based on a query or data change received at the primary database system. The one or more tasks are sent to the scheduler process.

The scheduler process determines whether a task depends on any other task. If a task depends on another task, then the other task needs to be processed first. For example, if a query targets a database object that was updated by a data change, then the data change needs to be made at the secondary database system before the query can be executed by the secondary database system.

Based on the task dependencies, the scheduler process can determine an order for tasks to be processed. The scheduler process may also determine whether a query should be executed at primary database system or sent to the secondary database system, based on the total time required, including propagating data changes to the secondary database system.

Thus, the database system can flexibly schedule queries and data changes in order to minimize query execution time. For example, queries that do not rely on an update can be executed before other database updates, and data changes that are not needed by any queries can be delayed until other queries are executed.

System Overview

Figure 1:
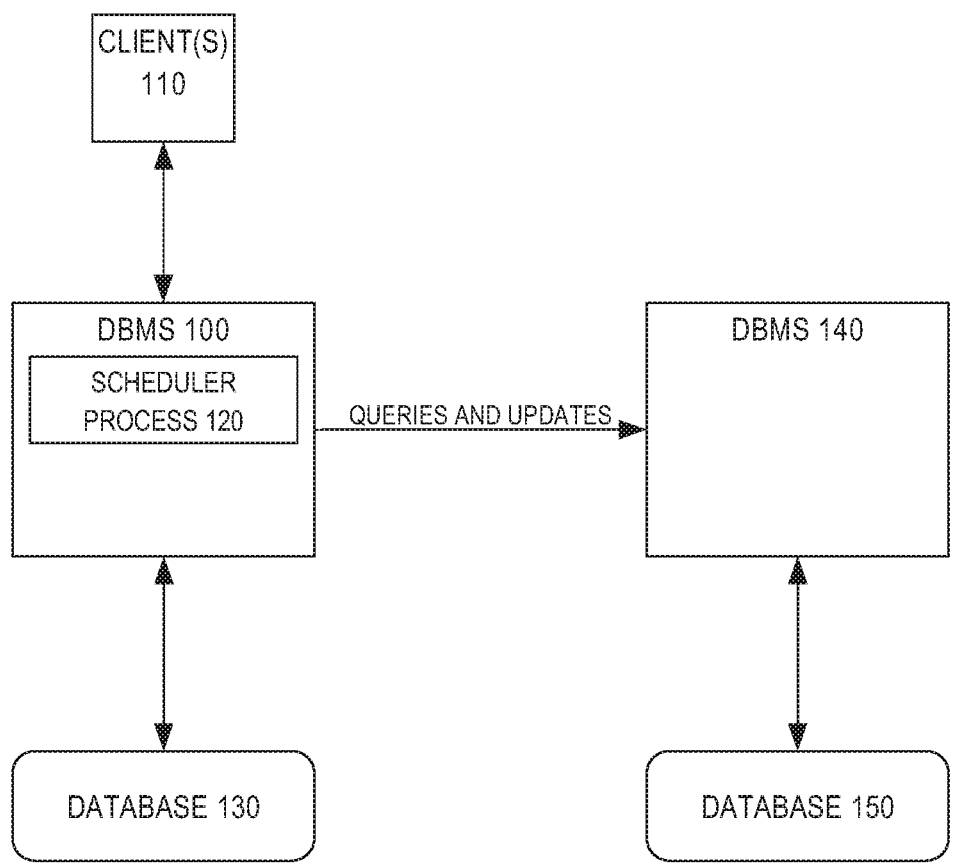
FIG. 1 is a block diagram illustrating an example primary database system and secondary database system.

FIG. 1 illustrates an example primary database management system (DBMS) and an offload DBMS for the primary DBMS. Primary database system 100 comprises one or more database servers that are connected to a database 130. Database 130 may be stored on one or more disks to which primary database system 100 has access. One or more clients 110 may connect to primary database system 100. Client 110 may be a client computer system or a client application. Client 110 may submit queries and database changes for database 130 to primary database system 100.

Primary database system 100 is also connected to a secondary database system 140, which may be an offload database system for primary database system 100. In an embodiment, secondary database system 140 is configured to execute queries, or parts of queries, more efficiently than primary database system 100. Secondary database system 140 is connected to database 150. Database 150 may be stored on one or more disks to which secondary database system 150 has access. Database 150 may store a copy of at least a portion of the data stored in database 130. In an embodiment, database 150 is an asynchronous replica of database 130. As used herein, an asynchronous replica refers to a replica database wherein data may be first written to a primary database and acknowledged as being completed before being copied to a secondary database.

In an embodiment, secondary database system 140 is not configured to receive and/or handle database queries such as SQL statements from end users. Client 110 does not connect directly to secondary database system 140, or send queries or changes directly to secondary database system 140. Rather, queries and data changes from client 110 are received at primary database system 100. Primary database system 100 determines whether to send any queries, or portions thereof, to secondary database system 140 for processing. Data changes are made to database 130, and then reproduced in or copied to database 150.

Primary database system 100 also comprises a scheduler process 120. As described in further detail below, when primary database system 100 receives a query, scheduler process 120 determines if the query, or a portion thereof, should be executed by secondary database 140. Scheduler process 120 determines when, and in what order, the queries (or portions of queries) and data changes should be sent to the secondary database system 140.

As used herein, "scheduler process" refers to a database process that schedules queries and data changes. The scheduler process schedules queries and data changes to be sent to the secondary database system. In an embodiment, the scheduler process also schedules queries and data changes for execution by the primary database system.

In an embodiment, the scheduler process is a database process running on the primary database system. In an embodiment, the scheduler process is a background process that receives queries and data changes from one or more foreground database processes that receive and process queries and database updates. For example, a foreground database process may include a query coordinator or a query optimizer. The scheduler process determines if, and when, a query or database update should be sent to the secondary database system, and communicates scheduling decisions to the one or more foreground database processes. In another embodiment, the scheduler process may be the same process, or part of a group of processes, that receives and processes queries and database updates for the primary database system.

In an embodiment, the scheduler process is configured to send queries and database changes directly to the secondary database system. In another embodiment, the scheduler process communicates with a foreground process to cause queries or database changes to be sent to the secondary database system.

Task Overview

The scheduler process receives queries and data changes to be sent to the secondary database system as one or more jobs or tasks. As referred to herein, a task is a unit of work that could be sent to, and processed by, the secondary database system. The scheduler process receives two types of tasks: query tasks and update tasks.

A task may comprise task data including: one or more target database objects, the size and/or number of database objects, the amount of time required to process the task at the primary database system, the amount of time required to process the task at the secondary database system, the time at which the corresponding query or data change was received by the primary database system, the time at which the task was created, the time at which a task was received by the scheduler process, and/or a target time for completing the task (a task "deadline").

In an embodiment, each task includes data that indicates an order in which the task was received. For example, the task may include one or more timestamps, or values, which indicate the time at which the corresponding query or data change was received by the primary database system, the task was generated by the database system, and/or when the task was received by the scheduler process.

The scheduler process maintains a task list and a priority queue. In an embodiment, the task list and priority queue are stored in memory assigned to the scheduler process. In another embodiment, the task list and priority queue are stored in memory shared by other database processes or are stored on a persistent disk.

The task list stores a list of tasks received by the scheduler process. In an embodiment, task data for each task is stored in the task list in association with the task.

The priority queue indicates an order in which tasks should be processed. In an embodiment, each task is associated with a priority value and tasks in the priority queue are stored in order of priority value. When the scheduler process sends a task to the secondary database, it selects one or more tasks from the front of the priority queue.

Query Tasks

A query task is a query, or a portion of a query, that may be offloaded to a secondary database system for processing. The query task may comprise data indicating the data objects targeted by the query task. The query task may also include data indicating an estimated cost for processing the query task in the primary database system and/or an estimated cost for processing the query task in the secondary database system.

A single query may be divided into a plurality of query tasks, based on the data required by the query. For example, database 150 may store a copy of only a portion of the data from database 130. The primary database system 100 may receive a query that targets some data that is in database 150, and some data that is only in database 130. A query task may be generated for the portion of the query that targets data stored in database 150, while the portion of the query that targets data not copied in database 150 is processed at the primary database system.

To execute a query, a DBMS first generates a query execution plan. An execution plan generated by a DBMS defines operations to be performed to execute a query and an order for performing the operations, known as plan operations. When a database instance receives a query, a query coordinator formulates a query execution plan for executing the query.

In an embodiment, a query optimizer determines whether one or more portions of the query could be executed more efficiently by the secondary database system. The query optimizer may determine the one or more portions based on, for example, the structure and contents of the query, the database objects targeted by the query, the database objects stored in the secondary database, and the types of queries that the secondary database system is configured to process. The query optimizer generates a query task for each of the one or more portions, and sends the query task to the scheduler process. For the purpose of illustrating a clear example, techniques are described with reference to queries, but may be used with portions of queries.

Update Tasks

An update task is a set of data changes to be propagated to the secondary database system. Unlike query tasks, data changes are made at both the primary database system and the secondary database system. The update task may be generated after a change has been committed in the primary database system, or generated when a data change, such as a DML (data manipulation language) statement, is received by the primary database system.

The update task may comprise data indicating changes or deletions made to the primary database. The update task may also include data indicating an estimated cost for processing the update task in the secondary database system.

In an embodiment, the data indicating data changes includes one or more identifiers associated with one or more respective database objects. For example, the data may include a plurality of row identifiers. The data may indicate the changes, additions, or deletions to be made for each respective database object. The identifiers and the changes are sent to the secondary database system as part of sending an update task to the secondary database system for processing. When the update task received by the secondary database system, the secondary database system may use the data to determine which database objects to update and what data should be modified, added, or deleted.

Task Dependency

The scheduler process determines if any dependencies exist between received tasks. If a first task depends on a second task, then the second task needs to be processed before the first task may be processed. For example, if a query depends on a database object that was updated before the query was received, then the update needs to be propagated to the secondary database system before the query can be executed at the secondary database system.

A task dependency exists when a task targets a database object that is modified by a previously received update task. A database object may include a row, a table, or a table partition. For example, assume a first update task targets a particular table. If an update task or query task, received after the first update task, also targets the particular table, then the update task or query task depends on the first update task. In contrast, if an update task or query task is received after a previous query task, the update task or query task would not depend on the previous query task, since no data was modified. Similarly, if the first update task is processed before the query or update task is received, then the query or update task does not depend on the first update task, since the data change has already been propagated.

In an embodiment, the task list includes data that indicates task dependencies. For example, the data may indicate, for each task, which tasks in the task list it depends upon. In another embodiment, the database system stores a separate mapping that indicates task dependencies. For example, the database system may store a directed graph, where each node of the graph corresponds to a task, and the edges of the graph indicate a dependency between two nodes.

Figure 2A:
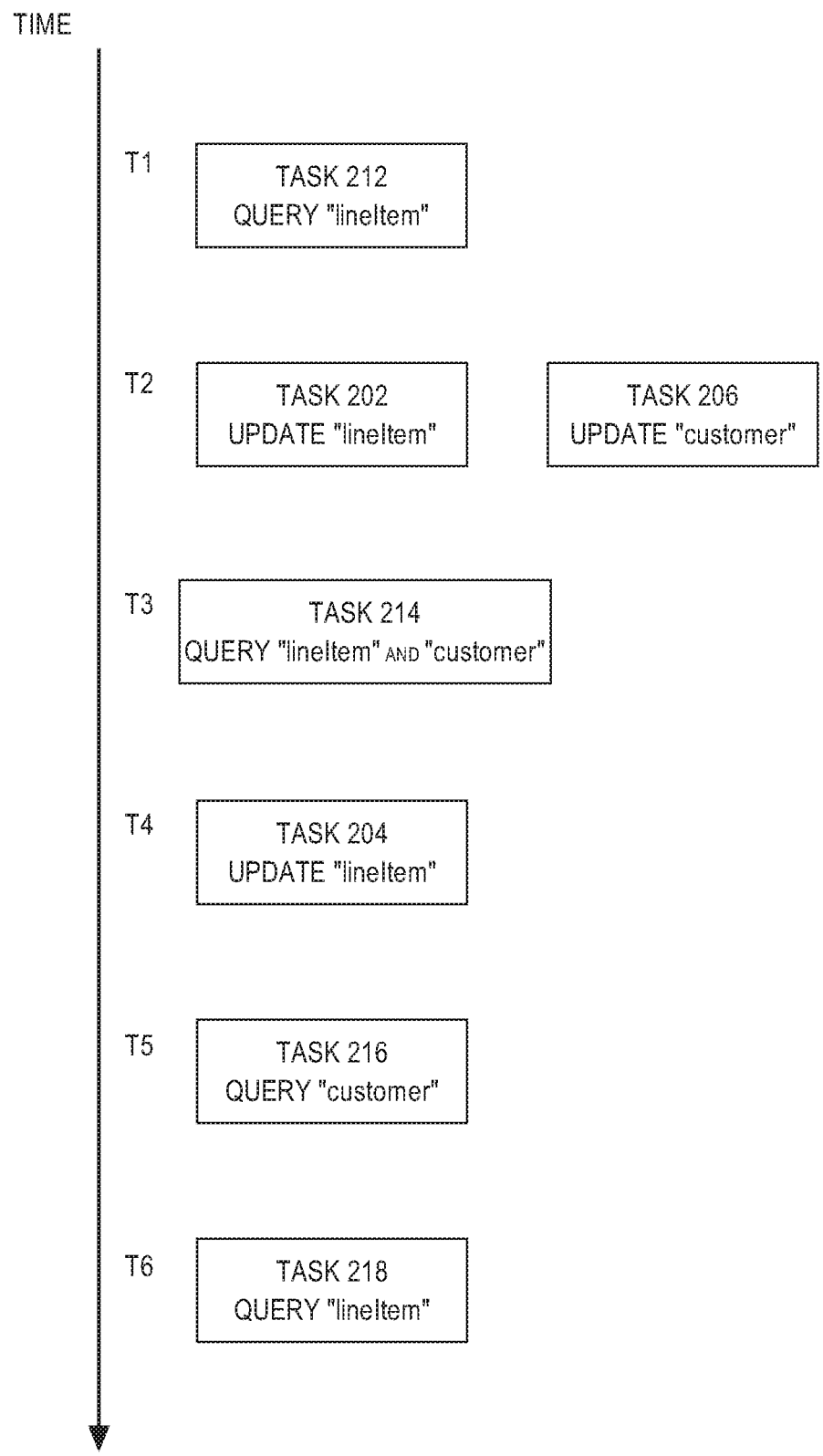
FIG. 2A is a block diagram illustrating tasks received by a primary database system.

Referring to FIG. 2A, it illustrates a plurality of tasks received by a scheduler process. Assume database 130 includes a table "lineItem" and a table "customer". As illustrated in FIG. 2A, the scheduler process receives seven tasks:

At time T1, the scheduler process receives query task 212, which targets the "lineItem" table;

At time T2, the scheduler process receives update task 202, which targets the "lineItem" table, and update task 206, which targets the "customer" table;

At time T3, the scheduler process receives query task 214, which targets both the "lineItem" table and the "customer" table;

At time T4, the scheduler process receives update task 204, which targets the "lineItem" table;

At time T5, the scheduler process receives query task 216, which targets the "customer" table; and At time T6, the scheduler process receives query task 218, which targets the "lineItem" table.

Based on the order in which the tasks are received, the scheduler process determines what task dependencies, if any, exists between the tasks. In an embodiment, the scheduler process determines an order in which tasks are received based on a timestamp value associated with the task. The timestamp value may indicate when the task was generated or when the query or data change was received. As an example, query task 212 may be associated with a timestamp value indicating time T1. In another embodiment, the scheduler process stores each task in the task list in the order in which it was received by the scheduler process.

Figure 2B:
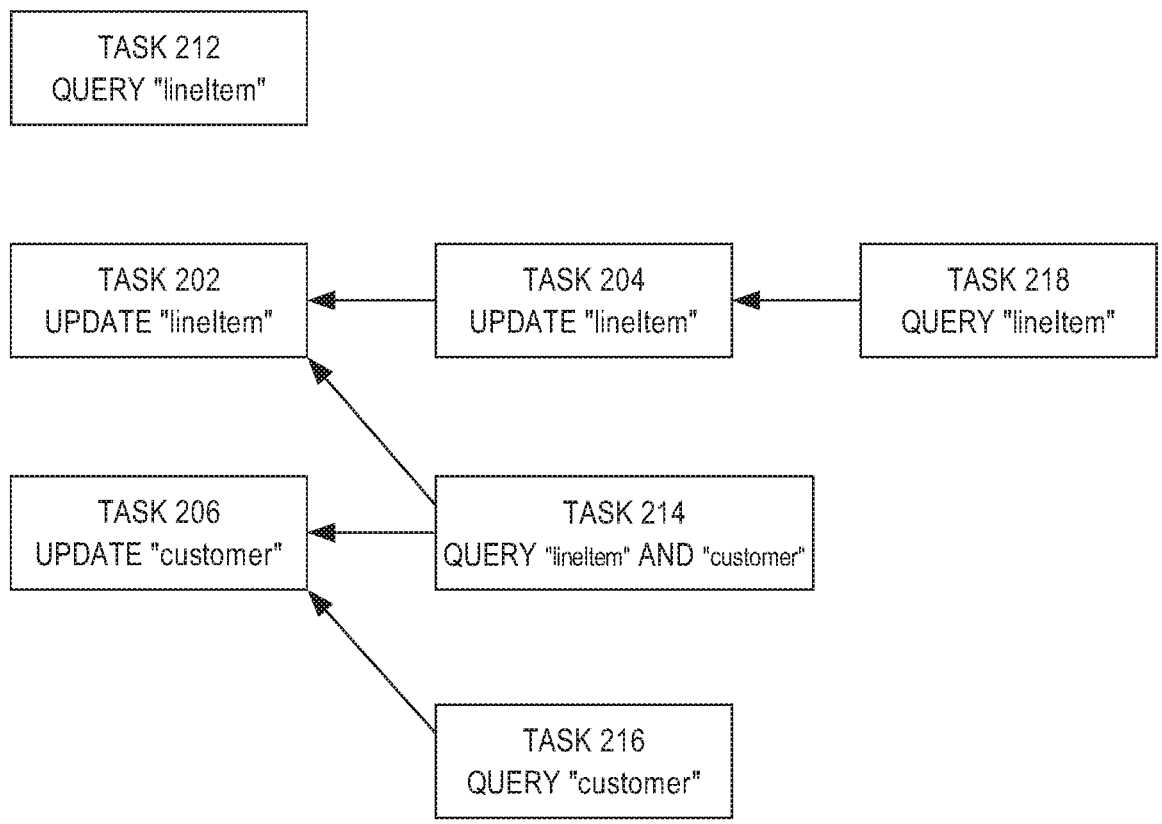
FIG. 2B is a block diagram illustrating dependencies between tasks.

FIG. 2B illustrates task dependencies for the received tasks.

If a task targets a database object that was not targeted by a previously received update task, then the task does not depend on any tasks. For example, query task 212 is received before any update tasks that targets the "lineItem" table, so it does not depend on any tasks. Similarly, update tasks 202 and 206 were received before any updates that target their respective tables, so update task 202 and 206 also do not depend on any tasks.

If a task is received after an update task and targets the same database object as the update task, then it depends on the update task. For example, update task 204 is received after update task 202 and both update tasks target the "lineItem" table. Thus, update task 204 depends on update task 202.

A task may depend, either directly or indirectly, on more than one update tasks. For example, query task 218 is received after update task 204 and also targets the "lineItem" table. Thus, query task 218 depends on update task 204. Query task 218 also indirectly depends on update task 202, since update task 204 depends on update task 202. Thus, query task 218 requires both update task 202 and update task 204 to process prior to being executed.

As another example, query task 214 is received after update task 202 and update task 206. Query task 214 targets the "lineItem" table, which was updated by update task 202.

Query task 214 also targets the "customer" table, which was updated by update task 206. Thus, query task 214 depends on both update task 202 and update task 206.

Task Cost

Each task may be associated with a task cost. A task cost is an estimated amount of time for a task to be processed by a database system.

The task cost for an update task is an estimated amount of time for propagating the update to the secondary database system. In an embodiment, the cost is based on the initial cost of populating the secondary database system. When the secondary database system is first configured and initialized, data is copied from the primary database system to the secondary database system. Based on the amount of data copied from the primary database system and the amount required to copy the data, the primary database system can compute an average time for propagating data. For example, a number of rows may initially be copied to the secondary database system and an average amount of time per row may be calculated. An estimated amount of time for an update task may be computed based on the average amount of time per row and the number of rows targeted by the update task.

In an embodiment, the database system may update the average time for data propagation by tracking the amount of time taken by each update task and the amount of data targeted by each update task. The updated average time may be used for estimating a cost for subsequent update tasks.

The task cost for a query task is an estimated execution cost for the query. A query task may be associated with two execution costs: an execution cost for executing the query in the primary database system and an execution cost for executing the query in the secondary database system.

An execution cost for executing a query task may be calculated by a query optimizer. In an embodiment, the process scheduler requests the execution cost from the query optimizer after it receives a task. In another embodiment, the query optimizer determines whether a query is a candidate for processing in the secondary database system. The query optimizer may determine that the query is a candidate for processing in the secondary database system if the execution cost for executing in the secondary database system is less than the execution cost for executing in the primary database system. The task data for the query task may include the primary database system execution cost and the secondary database system execution cost.

In an embodiment, the execution cost for a query task includes the cost of propagating changes to database objects required by the query task. If one or more tasks need to be processed prior to processing the query task, the execution cost of each of the one or more tasks is added to the execution cost for processing the query task. In an embodiment, the scheduler process determines task dependencies for a task and calculates an updated secondary database system execution cost based on task dependencies for the query task. For example, referring to query task 218, the total task cost includes the execution cost of the query at the secondary database system, as well as the task cost for update task 202 and update task 204.

Scheduling Tasks

When the scheduler process receives a query task, it determines either: 1) the query task should be sent to the secondary database system; 2) the query task should be processed in the primary database system; or 3) the query task should wait before processing. Waiting to process the query task may include waiting for other query tasks to be processed and/or waiting for database updates to be propagated to the secondary database system.

Figure 3:
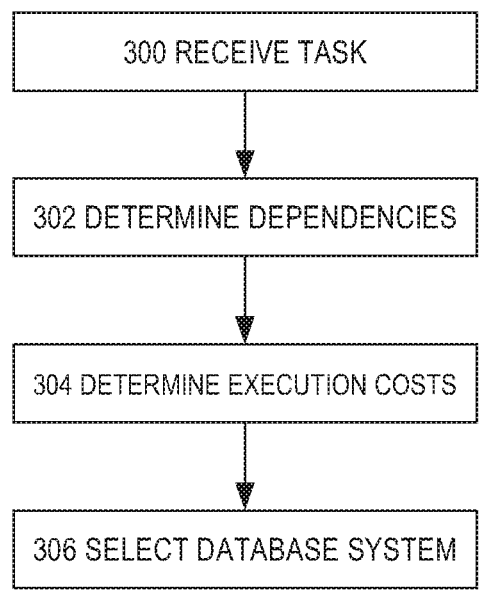
FIG. 3 is a flowchart illustrating steps for scheduling a task.

FIG. 3 illustrates a flowchart for scheduling tasks received by a scheduler process.

At step 300, the scheduler process receives a task. The scheduler process adds the received task and task data to the task list. In an embodiment, the scheduler process adds data indicating a time at which the task was received to the task data. For the purpose of illustration, assume scheduler process 120 receives query task 218.

At step 302, the scheduler process determines if the received task depends on any previously received tasks. As described above, the task dependencies are used to determine an estimated execution time for processing the task on the secondary database system. The scheduler process stores the dependency data in a task dependency mapping. In the present example, scheduler process 120 determines that query task 218 depends on task 204, which depends on task 202.

At step 304, the scheduler process determines the task costs for the task. If the task is a query task, the scheduler process determines the execution cost for processing the task at the primary database system and the secondary database system. In an embodiment, the scheduler process requests the execution costs for the query task from a query optimizer. In another embodiment, the execution cost for the query task is stored in the task data received by the scheduler process.

As described above, the execution cost for a query task on the secondary database system includes the costs for any update tasks that the query task depends on. Based on the dependencies determined in step 302, the scheduler process determines the total execution cost for processing the task at the secondary database system. In the present example, the total execution cost for task 218 includes the task cost for task 204 and the task cost for task 202.

At step 306, the scheduler process determines whether to execute a task in a primary database system or a secondary database system. An update task is always processed by the secondary database system. A query task may be processed by a secondary database system or the primary database system based on the respective execution costs.

In an embodiment, each task is associated with a deadline. The scheduler process may determine the deadline based on the task cost and store the deadline in task data. As referred to herein, a deadline is a time by which a task should be executed. The deadline for a query task is based on the execution cost for the primary database system. For example, the deadline for query task may be the time at which the query task is received, plus the primary database execution cost.

The deadline for an update task is based on the tasks that depend on the update task. If one or more tasks depend on the update task, then the deadline for the update task is the shortest deadline from the respective deadlines of the one or more tasks. In an embodiment, if the received task depends on an update task, then the deadline for the update task may be updated based on the deadline for the received task. If no task depends on the update task, then the update task has no deadline. In an embodiment, if the task has no deadline, then the deadline may be indicated in task data by a large value.

The current time, or the time at which the task was received, plus the total execution cost for processing a query task on the secondary database system, is compared with the deadline to determine whether the query task will meet the deadline. If a query task will not meet the deadline, then the scheduler process determines that the query task should be processed in the primary database system. For example, if the current time plus the total execution cost at secondary database system for query task 218 will exceed the deadline, then scheduler process 120 determines that task 218 should be executed at the primary database system.

If a query task will meet the deadline, then the scheduler process determines that the task should be executed in the secondary database system. In an embodiment, when the scheduler process determines that a task should be sent to the secondary database system, it sends the task to the secondary database system or notifies a foreground process that the task should be sent to the secondary database system.

In another embodiment, the scheduler process adds tasks that will be sent to the secondary database system to a priority queue. Each task is associated with a priority value and tasks in the priority queue are sorted based on the priority value. The scheduler process may be configured to assign priorities to tasks based on optimization goals for the database systems, such as maximizing secondary database system usage and minimizing query execution time.

The priority value of a task may also be based on the task deadline. For example, the priority value may be the inverse of the task deadline, such that tasks with an earlier deadline may be added to the front of the queue, while tasks with a later deadline or no deadline (i.e., an update task with no dependent tasks) may be added to the end of the queue.

In an embodiment, the scheduler process adds a task to the priority queue when it is ready to be sent to the secondary database system. A task is ready to be sent if it does not depend on any other tasks. If a task depends on another task, the task remains in the task list and is not added to the priority queue. Once the task it depends on is removed from the priority queue, the scheduler process adds the task to the priority queue.

Completeting Scheduled Tasks

Figure 4:
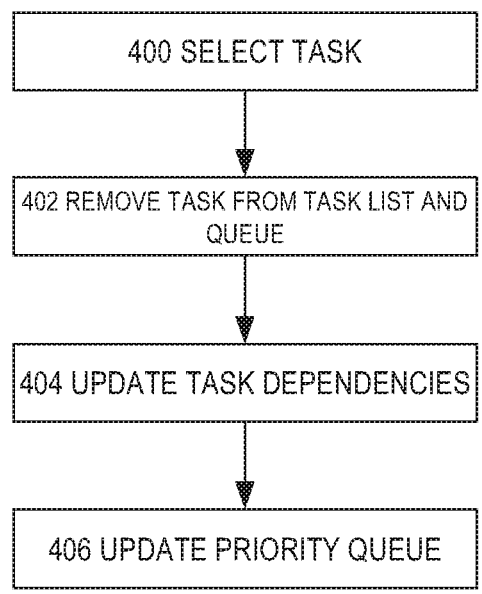
FIG. 4 is a flowchart illustrating steps for sending tasks to a secondary database system.

After tasks are added to the priority queue, the scheduler process periodically selects one or more tasks to be sent to the secondary database system. FIG. 4 illustrates a flowchart for sending scheduled tasks to secondary database.

At step 400, the scheduler process selects one or more tasks from the priority queue to send to the secondary database system. In an embodiment, the number of tasks is based on the number of tasks the secondary database system can process concurrently. For example, if the secondary database system processes tasks serially, then the scheduler process may select a single task. If the secondary database system processes tasks in parallel, for example, if the secondary database system is a multi-node database system, then the scheduler process may select a plurality of tasks to be processed in parallel.

In an embodiment, the scheduler process sends the task to the secondary database system directly. In another embodiment, the scheduler process notifies a foreground database process of the scheduling decision, and the foreground database process sends the task to the secondary database.

At step 402, the one or more selected tasks are removed from the task list and the priority queue. In an embodiment, the tasks are removed from the task list after the secondary database system has indicated that the tasks were completed. For example, the secondary database system may send a message to the primary database system when a data change has been completed or when a query has finished processing. As another example, the secondary database system may send the results for a query to the primary database system when it has finished processing the query.

At step 404, the task dependencies for remaining tasks are updated. Updating the task dependencies may include determining which tasks depended on the completed task and re-calculating their estimated cost based on the actual time taken to complete the task, removing the completed task from a task dependency mapping, and/or adding newly received tasks to the priority queue.

For example, if a subsequently received task requires a database object that was updated by the completed task, the received task would not depend on the completed task, since the completed task has been removed from the task list and the task dependency mapping. In other words, the cost of processing the received task at the secondary database system would not include the cost of processing the completed task, since the task has already been completed.

At step 406, the scheduler process updates the priority queue to determine if remaining query tasks should still be sent to the secondary database system. In an embodiment, the scheduler process determines whether each query task could still be processed before their respective deadline. The scheduler process may compare the deadline for each query task with the current time and estimated time for processing in the secondary database system. If the estimated processing time exceeds the deadline, then the scheduler process may determine that the query task should be processed at the primary database system.

In an embodiment, the scheduler process may notify a foreground process that the task should be processed at the primary database system. In another embodiment, the scheduler process schedules the task to be processed by the primary database system.

In an embodiment, if the scheduler process determines that the query task should be processed at the primary database system, the query task is removed from the task list and the priority queue. The deadline for update tasks that the query task depended on are updated, if necessary, and the priority queue may be re-sorted based on the updated deadlines.

If tasks remain in the priority queue, the process returns to step 400 to select one or more new tasks to process.

DBMS Overview

Embodiments of the present invention are used in context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more database containers. Each container contains records. The data within each record is organized into one or more fields. In relational DBMSs, the data containers are referred to as tables, the records are referred to as rows, and the fields are referred to as columns. In object-oriented database, the data containers are referred to as object classes, the records are referred to as objects, and the fields are referred to as attributes. Other database architectures may use other terminology.

A database block, also referred to as a data block, is a unit of persistent storage. A database block is used by a database server to store database records (e.g., to store rows of a table, to store column values of a column). When records are read from persistent storage, a database block containing the record is copied into a database block buffer in RAM memory of a database server. A database block usually contains multiple rows, and control and formatting information (e.g., offsets to sequences of bytes representing rows or other data structures, list of transactions affecting a row). A database block may be referenced by a database block address.

A multi-node database management system is made up of interconnected nodes that share access to the same database or databases. Typically the nodes are interconnected via a network and share access, in varying degrees, to shared storage, e.g. shared access to a set of disk drives and data blocks stored thereon. The nodes in the multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system may host a database server. A server, such as a database server, is a combination of integrated software components and an allocation of computational resources, such as memory, a node, and processes on the node for executing the integrated software components on a processor, the combination of the software and computation resources being dedicated to performing a particular function on behalf of one or more clients.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
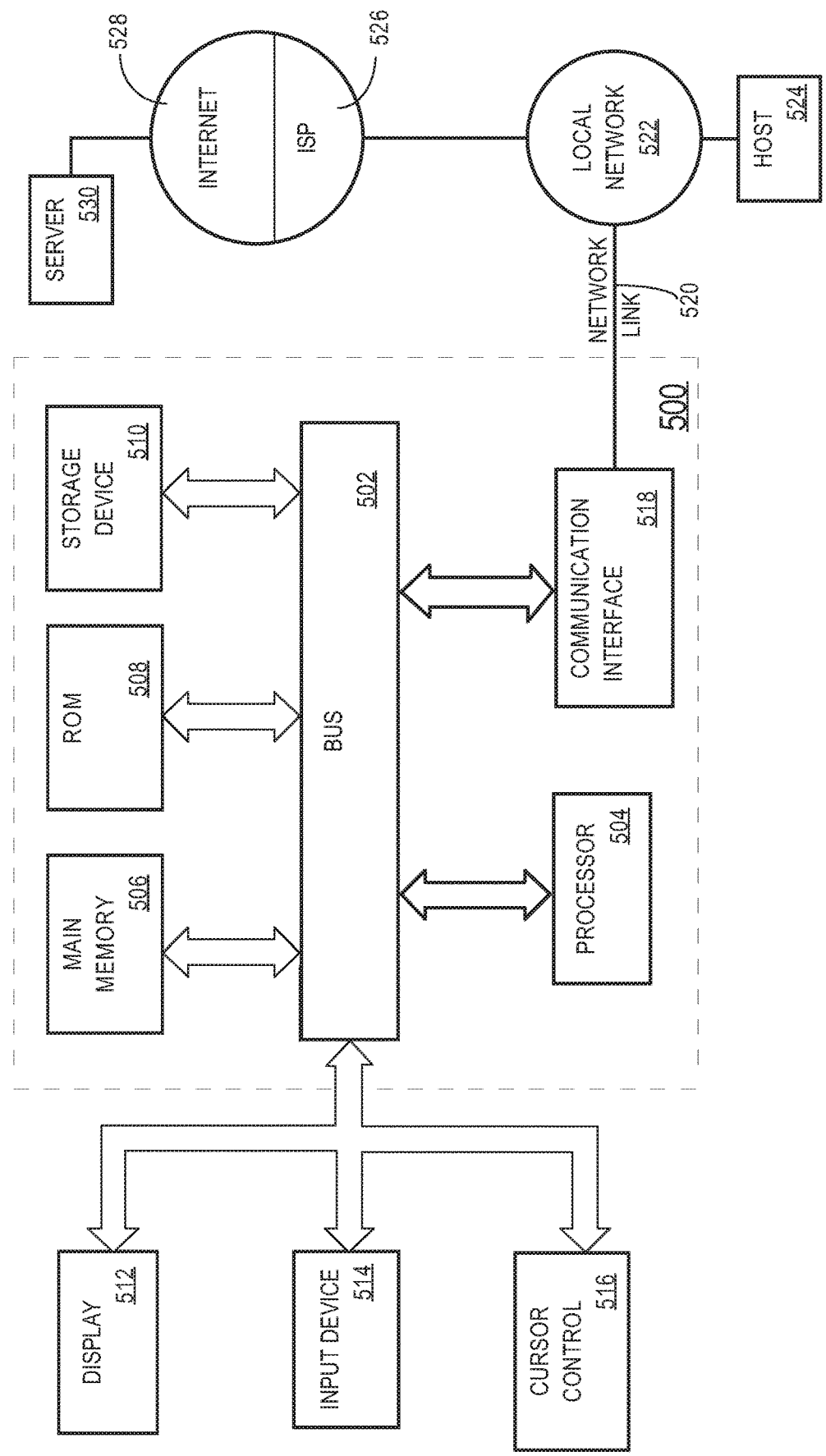
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   accessing a query at a primary database management system (DBMS) comprising a primary database, an offload DBMS, and an asynchronously-updated database replica accessed by said offload DBMS to calculate query operations requested by said primary DBMS, said asynchronously-updated database replica being an asynchronously-updated replica of at least a portion of said primary database;
   calculating a first execution cost for executing the query on the primary DBMS;
   identifying one or more update tasks, of a plurality of tasks not yet propagated to the asynchronously-updated database replica, each of the one or more update tasks comprising information for a change made to data in a database object, in the primary database, for which access is required by execution of the query;
   wherein the plurality of tasks not yet propagated to the asynchronously-updated database replica further comprises one or more other tasks for one or more other database objects other than one or more particular database objects for which access is required by execution of the query;
   wherein each of the one or more update tasks is associated with a calculated execution cost;
   calculating a cost of synchronizing the one or more particular database objects, in the asynchronously-updated database replica, to incorporate one or more data changes reflected in the one or more update tasks;
   calculating a second execution cost for executing the query on said offload DBMS based on said cost of synchronizing said one or more particular database objects; and
   causing the query to be executed by either the primary DBMS or the offload DBMS, based on the first execution cost and the second execution cost.

2. The method of claim 1, further comprising:
   causing the query to be executed by the primary DBMS if the first execution cost is less than the second execution cost; or
   causing the query to be executed by the offload DBMS if the first execution cost is greater than the second execution cost.

3. The method of claim 1 wherein the offload DBMS is configured to process at least some queries more efficiently than the primary DBMS.

4. The method of claim 1 wherein the query comprises one or more query portions, and said calculating the first execution cost, said calculating the cost of synchronizing, said calculating the second execution cost, and said causing the query to be executed are performed for each query portion of the one or more query portions.

5. The method of claim 1 wherein the query is caused to be executed by the offload DBMS, the method further comprising:
   synchronizing the one or more particular database objects to incorporate the one or more data changes reflected in the one or more update tasks, prior to causing the query to be executed by the offload DBMS.

6. The method of claim 1 wherein the query is caused to be executed by the offload DBMS, the method further comprising:
   identifying second one or more data changes to second one or more database objects for which access is not required by execution of the query; and
   causing the query to be executed by the offload DBMS prior to synchronizing the second one or more data changes to the second one or more database objects for which access is not required by execution of the query.

7. The method of claim 1 further comprising:
   storing a mapping that indicates the one or more update tasks for the one or more particular database objects for which access is required by execution of the query; and
   calculating the cost of synchronizing the one or more particular database objects based on the mapping.

8. The method of claim 1 further comprising:
   storing a queue for sending information for queries and data changes to the offload DBMS;
   wherein the query is caused to be executed by to the offload DBMS;
   wherein causing the query to be executed by the offload DBMS comprises adding information for the query to the queue.

9. The method of claim 8 further comprising adding the information for the query to the queue based on a priority value.

10. The method of claim 8, wherein:
    the query is a particular query;
    the queue stores a set of one or more tasks;

each task of the set of one or more tasks represents one of
(a) a query, or (b) a data change;
a particular task, of the set of one or more tasks, represents
the particular query;
the method further comprises selecting the particular task
from the queue to send to the offload DBMS.

11. The method of claim 8, wherein:
the query is a particular query;
the queue stores a set of one or more tasks;
each task of the set of one or more tasks represents one of
(a) a query, or (b) a data change;
a particular task, of the set of one or more tasks, represents
a particular data change;
the method further comprises:
selecting the particular task from the queue to send to
the offload DBMS, and
in response to selecting the particular task from the
queue, for each query-type task in the queue:
determining an updated second execution cost, and
wherein the particular query is caused to be executed
by the primary DBMS if the updated second
execution cost is greater than the first execution
cost.

12. One or more non-transitory computer-readable media
storing one or more sequences of instructions that, when
executed by one or more hardware processors, cause:
accessing a query at a primary database management
system (DBMS) comprising a primary database, an
offload DBMS, and an asynchronously-updated database replica accessed by said offload DBMS to calculate query operations requested by said primary DBMS,
said asynchronously-updated database replica being an
asynchronously-updated replica of at least a portion of
said primary database;
calculating a first execution cost for executing the query
on the primary DBMS;
identifying one or more update tasks, of a plurality of
tasks not yet propagated to the asynchronously-updated
database replica, each of the one or more update tasks
comprising information for a change made to data in a
database object, in the primary database, for which
access is required by execution of the query;
wherein the plurality of tasks not yet propagated to the
asynchronously-updated database replica further comprises one or more other tasks for one or more other
database objects other than one or more particular
database objects for which access is required by execution of the query;
wherein each of the one or more update tasks is associated
with a calculated execution cost;
calculating a cost of synchronizing the one or more
particular database objects, in the asynchronously-updated database replica, to incorporate one or more data
changes reflected in the one or more update tasks;
calculating a second execution cost for executing the
query on said offload DBMS based on said cost of
synchronizing said one or more particular database
objects; and
causing the query to be executed by either the primary
DBMS or the offload DBMS, based on the first execution cost and the second execution cost.

13. The one or more non-transitory computer-readable
media of claim 12, wherein the one or more sequences of
instructions include instructions that, when executed by one
or more processors, further cause:
causing the query to be executed by the primary DBMS
if the first execution cost is less than the second
execution cost; or
causing the query to be executed by the offload DBMS if
the first execution cost is greater than the second
execution cost.

14. The one or more non-transitory computer-readable
media of claim 12 wherein the offload DBMS is configured
to process at least some queries more efficiently than the
primary DBMS.

15. The one or more non-transitory computer-readable
media of claim 12 wherein the query comprises one or more
query portions, and said calculating the first execution cost,
said calculating the cost of synchronizing, said calculating
the second execution cost, and said causing the query to be
executed are performed for each query portion of the one or
more query portions.

16. The one or more non-transitory computer-readable
media of claim 12, wherein:
the query is caused to be executed by the offload DBMS;
and
the one or more sequences of instructions include instructions that, when executed by one or more processors,
further cause: synchronizing the one or more particular
database objects to incorporate the one or more data
changes reflected in the one or more update tasks, prior
to causing the query to be executed by the offload
DBMS.

17. The one or more non-transitory computer-readable
media of claim 12, wherein:
the query is caused to be executed by the offload DBMS;
and
the one or more sequences of instructions include instructions that, when executed by one or more processors,
further cause:
identifying second one or more data changes to second
one or more database objects for which access is not
required by execution of the query, and
causing the query to be executed by the offload DBMS
prior to synchronizing the second one or more data
changes to the second one or more database objects
for which access is not required by execution of the
query.

18. The one or more non-transitory computer-readable
media of claim 12, wherein the one or more sequences of
instructions include instructions that, when executed by one
or more processors, further cause:
storing a mapping that indicates the one or more update
tasks for the one or more particular database objects for
which access is required by execution of the query; and
calculating the cost of synchronizing the one or more
particular database objects based on the mapping.

19. The one or more non-transitory computer-readable
media of claim 12, wherein the one or more sequences of
instructions include instructions that, when executed by one
or more processors, further cause:
storing a queue for sending information for queries and
data changes to the offload DBMS;
wherein the query is caused to be executed by to the
offload DBMS;
wherein causing the query to be executed by the offload
DBMS comprises adding information for the query to
the queue.

20. The one or more non-transitory computer-readable
media of claim 19, wherein the one or more sequences of
instructions include instructions that, when executed by one or more processors, further cause adding the information for the query to the queue based on a priority value.

21. The one or more non-transitory computer-readable media of claim 19, wherein:
the query is a particular query;
the queue stores a set of one or more tasks;
each task of the set of one or more tasks represents one of (a) a query, or (b) a data change;
a particular task, of the set of one or more tasks, represents the particular query; and
the one or more sequences of instructions include instructions that, when executed by one or more processors, further cause selecting the particular task from the queue to send to the offload DBMS.

22. The one or more non-transitory computer-readable media of claim 19, wherein:
the query is a particular query;
the queue stores a set of one or more tasks;
each task of the set of one or more tasks represents one of (a) a query, or (b) a data change;
a particular task, of the set of one or more tasks, represents a particular data change;
the one or more sequences of instructions include instructions that, when executed by one or more processors, further cause:
selecting the particular task from the queue to send to the offload DBMS, and
in response to selecting the particular task from the queue, for each query-type task in the queue:
determining an updated second execution cost, and
wherein the particular query is caused to be executed by the primary DBMS if the updated second execution cost is greater than the first execution cost.

* * * * *